United States Patent
Burelle et al.

[15] 3,660,184
[45] May 2, 1972

[54] PROCESS FOR MANUFACTURING TIGHT SEALS, AND SEALS OBTAINED BY THIS PROCESS

[72] Inventors: Pierre Burelle, Le Vesinet; Jean Alfred Engelhardt, Lyon, both of France

[73] Assignee: Societe anonyme dite Cefilac, Paris, France

[22] Filed: May 18, 1970

[21] Appl. No.: 38,521

Related U.S. Application Data

[63] Continuation-in-part of Ser. No. 565,754, July 18, 1966, abandoned.

[30] Foreign Application Priority Data

July 29, 1965 France.....................................26541

[52] U.S. Cl..............................156/62.2, 117/29, 156/369, 161/214, 264/112, 277/227
[51] Int. Cl. .........................................................B29j 5/02
[58] Field of Search......................................156/62.2–62.8, 156/289, 369–377; 117/29, 33, 132; 161/186, 214, 215; 277/227, 233, 255; 264/122, 112

[56] References Cited

UNITED STATES PATENTS

| | | | |
|---|---|---|---|
| 3,560,324 | 2/1971 | Quackenbush | 156/62.2 X |
| 3,311,520 | 3/1967 | Michaelson et al. | 156/289 X |
| 2,577,205 | 12/1951 | Meyer et al. | 156/62.2 |
| 2,951,721 | 9/1960 | Asp | 277/227 X |
| 3,490,115 | 1/1970 | Owens | 156/62.2 X |
| 3,352,080 | 11/1967 | Rondum | 156/245 X |
| 3,506,521 | 4/1970 | Hullen et al. | 156/369 |
| 2,753,199 | 7/1956 | Victor | 277/233 |

Primary Examiner—Benjamin A. Borchelt
Assistant Examiner—H. J. Tudor
Attorney—Holcombe, Wetherill and Brisebois

[57] ABSTRACT

Method of forming gaskets by projecting a layer comprising 70–90% of a fibrous material and 10–30% of a settable binder onto a supporting sheet, causing the binder to set, and there compressing the layer. An adhesive may be used to secure the layer to the sheet, or the sheet may be treated to prevent adhesion of the layer and removed after the compression step.

16 Claims, No Drawings

PROCESS FOR MANUFACTURING TIGHT SEALS, AND SEALS OBTAINED BY THIS PROCESS

This application is a continuation-in-part of applicants' prior application, Ser. No. 565,754, filed July 18, 1966, now abandoned.

SUMMARY OF THE INVENTION

This invention relates to a method of manufacturing sealing members, such as cylinder-head gaskets for internal combustion engines.

A principal object of the present invention is to provide a simpler and more economical method than the methods heretofore known for manufacturing such gaskets when the greater part thereof consists of a fibrous material.

Another object of the invention is to provide gaskets having properties which are superior to those of comparable gaskets now known. A further object of the invention is to provide a process making it possible to control the thickness of the gasket at all points with great precision, and to correct any variation from that thickness, thus reducing the number of gaskets which have to be scrapped.

Yet another object of the invention is to provide a process which makes it possible to incorporate easily into the fibrous material of the gasket components insuring greater elastic recovery of the compressed gasket.

In accordance with the invention, the process of manufacturing gaskets comprises the projection of a mixture containing at least 70 parts by weight of a filler material, which is preferably fibrous and at most 30 parts of a settable binding agent so as to form a thick layer on at least one face of a support formed by a substantially flat sheet. The support provided with this layer is then subjected to a compression which reduces the thickness of this layer to less than one-tenth its original thickness, thus increasing its density at least 10 times. The layer is then treated to set the binding agent. The materials which may be used in accordance with the invention may take the form of fibers, granules, powders, or small scales, and are selected from the group consisting of:

Asbestos of the chrysotile crocidolite, or amosite type, the fibers of which are less than 15 mm long;
Natural cellulosic fibers such as those of manila or jute, or synthetic fibers such as a polyamide, polyester, polyvinylchloride, or epoxy resin. These fibers may vary in length up to 30 mm;
Powdered cork grains which may range from 0.1 to 6 mm in diameter;
Metallic fibers from 3 to 30 mm in length;

The aforesaid materials are given purely by way of example but others may be used, such as powdered elastomers.

These materials may be used along or in mixtures with each other. Thus, for example, gaskets according to the invention may be carried out by using mixtures of cellulosic fibers and polyamide fibers or mixtures of cork granules and cellulosic fibers.

In accordance with the invention, any binding agents may be used which are capable of being projected and which, after subsequent transformation, are capable of insuring the cohesion of the gasket according to the invention. In one method of carrying out the invention, the binding agents are used in the form of solid powders or granules which may be advantageously mixed with the fibrous or granular material during its projection onto the support. The cohesion of the binding agent usually results from a subsequent heat treatment which takes place during or after the compression of the various products projected onto the support, and causes fusion or polymerization of the binding agent.

Among the binding agents which may be used in accordance with the invention are phenolic resins, urea formol resins, epoxy resins, polyester resins, vinyl resins, polyethylene resins, gelatin, or elastomers such as those obtained from acrylonitrile butadiene, silicones, or polychloroprene.

In accordance with the invention, an adhesive which serves solely to cause the various constituents to adhere to the support may, during the application of these constituents to the support, be in a state which is capable of producing such adhesion.

In certain cases, the adhesive according to the invention may consist of the binding agent itself, for example when the latter is sprayed simultaneously but independently of the fibrous material, for example in a solution or in a liquid state. This may also be true when the fibrous material mixed with the binding agent in the form of solid particles is projected for example onto a support which has first been heated in order to insure at least partial melting of the binding agent and thereby produce the desired adhesive effect.

Suitable adhesives for use in accordance with the invention include synthetic resins, such as vinyl resins, polyethylene, phenoplastic resins, aminoplastic resins, epoxy resins, polyester resins, and the polyurethanes.

It is also possible to use adhesives having an elastomeric base such as natural rubber or synthetic rubber (GRS, butadiene, acrylonitrile, polychloroprene, butyl, fluorocarbons, silicones, etc.).

In all cases, the binding agent and adhesive must be selected in dependence upon the chemical nature of the materials to be projected so as to obtain the best final result. In accordance with the invention, the fibrous material and the binding agent whether particulate or not may be projected while suspended in a gas through one spraying nozzle, while the adhesive is sprayed through another spray gun.

When necessary, the fibrous material, the binding agent, the adhesive, when not mixed together, may be projected through three separate spray guns onto the support. In accordance with the invention, various types of support may be used. These include sheets which have been perforated by stamping with punches, which leave sharp edges on opposite sides of the sheet, while imparting the appearance of a rasp thereto.

It is also possible to use smooth sheets or even webs of a metallic material or webs made from asbestos or synthetic fibers.

The thickness of the sheet or the cloth is less than one-fourth of the thickness of the completed gasket.

According to a variation of the process according to the invention the material may be projected against a support to which it does not adhere. The support is then eliminated after a step which causes the binding agent to serve the function of the support.

The gaskets according to the invention may be manufactured by spraying the various products hereinbefore described onto continuous supporting strips and then cutting the strips in an appropriate manner to produce gaskets having the desired shapes.

The support may also be cut out first and the gasket produced in its final form by projecting the particulate material thereagainst.

The gaskets according to the invention may be produced by imparting to the fibers of which they are made particular orientations which are the same all over the surface of a single gasket or which may vary from one part of the gasket to another. This orientation of the fibers may be easily produced during spraying of the fibrous material by suitable orientation of the spray gun.

The gaskets according to the invention may also be produced by successively applying several layers of fibrous material, each of which is oriented in a different direction. This permits the production of mats of fibers the directions of which are, for example, crossed, which have been difficult to obtain economically in prior methods of manufacture.

The gaskets according to the invention may have different thicknesses at different points. This characteristic may be easily produced by spraying different parts of the gasket for different lengths of time.

This characteristic of gaskets according to the invention is very valuable because, as is well known, the technique of internal combustion engines is rapidly evolving toward the use of light alloys for making engine blocks while the cylinder jackets continue to be made of cast iron.

These have different rates of expansion which make the manufacture of cylinder head joints particularly difficult.

The gaskets according to the invention, which may be of different thicknesses at different points, make it possible to solve this problem in a particularly satisfactory manner, since the variations in the thickness of the gasket may substantially correspond to departures from flatness in the surfaces in contact with the gasket.

U.S. Pat. No. 2,753,199, already describes a metallic cylinder head gasket. The metallic sheet forming the gasket is covered on its two surfaces with a thin layer of a thermosetting resin to protect it against corrosion. This layer is covered with a thin layer of fibrous material, such as asbestos. The asbestos adheres to the layer of resin. According to this patent it is already known to apply to a metallic gasket a layer consisting of a mixture of thermosetting resins and a filler material. In view of the necessity to protect the metal against corrosion, this mixture comprises much more resin than fibrous material. It has been found that such coatings assist in the formation of a good seal.

These known processes, however, have certain disadvantages. In the first place the projection of a layer of fibers onto a subjacent layer of fresh resin makes it impossible to produce a thick layer of fibrous material because once the resinous layer is entirely covered with fibers, the fibers subsequently projected can no longer come in contact with the resinous layer and are thus not secured thereto.

On the other hand, if a mixture consisting of a major part of resin, and containing fibers or a powdered filler material, is projected onto the metallic sheet, instead of applying it with a roller as is known, it is possible to obtain thick sufficiently dense layers.

However, when the portion of resins is diminished and the proportion of fibrous or pulverulent materials is increased, the cohesion of the layer projected diminishes very rapidly and the seal formed becomes quickly unusable.

It follows that joints consisting principally of fibers or pulverulent materials with or without a thin internal metallic layer cannot be produced by projection. Only coatings comprising a high proportion of resin for metallic gaskets may be made in this manner.

By projecting a mixture comprising at least 70 parts of filler material, for example asbestos fiber, and at most 30 parts of binder, against a support, the inventor has found that he is able to obtain a very thick light layer having somewhat the appearance and consistency of fresh snow. Suprisingly, he has found that this light layer can easily be compressed with practically no loss by outward flow along its edges so that the material moves almost solely in the direction of compression, despite a compression which reduces the thickness of the layer to not more than one-tenth and in general about one one-hundredth of its original thickness. In order to avoid such great compression, which appears to cause difficulties especially when the layer projected against the support is several centimeters thick, applicant has successively projected several thinner layers one after the other, compressing each layer before projecting the next. It has been found that the different layers adhere very poorly to each other and that satisfactory gaskets cannot be made in this manner.

In order that the invention may be better understood, several examples thereof will now be described, purely by way of illustration and example.

EXAMPLE 1

A cylinder head gasket according to the invention is made in the following manner:

A mixture containing 90% by weight of chrysotile asbestos sold under the trademark "Grade 5R" and 10% by weight of phenoplastic resins sold by the former Plastugil Company (now called the Plastimer Company) under the trademark "Phenorez 71" is mechanically mixed together. The resin has a melting point at about 100° C.

This mixture is projected by a flocking gun perpendicularly against a perforated sheet of the rasp type having a thickness less than 0.5 mm and, for example, equal to 0.2 mm, which has been first spray-coated with 100 grams per square meter of a polyvinylacetate emulsion once called Rhodopas 5425 and now sold under the trademark "Rhodopas 5,000 SMR" by the Rhone Poulenc Company, diluted in an equal volume of water.

550 grams per square meter of a mixture of asbestos and phenoplastic resins is projected against each face of the sheet in a single pass. This produces, on each face, a light layer having the appearance of a snow or foam about 6 cm thick.

It will be appreciated that, by using particles of very small dimensions and spraying from a substantial height a high degree of homogeneity results. Moreover, it is easy to control the constancy of the thickness with the naked eye or by means of appropriate apparatus. If too great inequalities appear it is then easy to eliminate them, either by local leveling of the material or by adding supplementary material, and there will then be no substantial lack of uniformity in the thickness of the gasket when it is completed.

Since the layers in the present example are compressed so as to have a thickness of less than one one-hundredth their original thickness it will be seen that it is thus possible to obtain gaskets having a uniformity of thickness which cannot be obtained in the other known processes.

The product obtained in this manner is then subjected to a pressure of about 200 bars, calendared to a thickness of 1.2 mm, and the resins therein polymerized by heating them for about 15 minutes at a temperature of 130° C.

The gasket is then cut to the desired shape with an appropriate apparatus.

In this example the layer has been compressed to less than one one-hundredth of its original thickness without any substantial resulting lateral flow.

EXAMPLE 2

In order to produce a gasket according to the invention, a mixture containing 80–95% by weight of asbestos of the crocidolite type and 15–50% by weight of aminoplastic (urea-formol) resins sold by the Plastugil Company under the trademark "Uralite" are mechanically mixed together.

This mixture is then projected perpendicularly onto a perforated plate 0.2 mm thick which has first been cut to the shape of the gasket and coated with an epoxy varnish at the rate of 80 grams of varnish per square meter.

The mixture is projected onto each face of the sheet at the rate of 600 grams per square meter. The result is two layers, each a little more than 6 cm thick.

The gasket is then positioned for 20 minutes inside a heating press exerting a pressure of 200 bars at a temperature of 130° C. The thickness of each layer then becomes 0.55 mm.

EXAMPLE 3

In order to produce a gasket according to the invention a mixture is prepared which contains 70% by weight of cellulosic fibers known as "Manila Fibers" having a length of 3–5 mm, 20% by weight of polyamide fibers having a length of 3–5 mm, and 10% by weight of epoxy fibers sold by the Van Cauvenberghe Company under the trademark "Tritorga."

The mixture is projected perpendicularly against a support consisting of a sheet of glass which is impregnated with silicones so as to prevent adhesion of the particles thereto.

This is subsequently compressed under a pressure of 60–80 bars for 10 minutes at a temperature of 150° C.

The sheet of glass is then removed and the gaskets are cut from the sheets obtained in this manner.

In each of the three foregoing examples 20 parts of elastomer particles may be mixed with the fibers to be projected. This results in the dispersal of the elastomer particles in the fibrous mass. These particles nevertheless retain a certain degree of freedom which suffices to permit them to elastically deform thus improving the elastic recovery of the gasket when it has been compressed. These elastomer particles may have any desired shape, but are preferably spherical.

EXAMPLE 4

A gasket according to the invention is produced by projecting asbestos of the chrysotile type sold under the trademark "-Grade 5R" onto a smooth sheet which has first been coated with an acrylonitrile butadiene rubber solution at the rate of 25 grams of rubber per square meter of sheet.

On each face there is first applied a first layer of asbestos using a spray gun which is inclined at 35° to the surface of the sheet. A second very fine layer of a binding agent consisting of the same solution of acrylonitrile butadiene rubber as the adhesive is then applied.

A second layer of asbestos is then projected at an angle of 145° to the sheet.

A number of successive projections of asbestos are made which vary in dependence on the thickness of the gasket which is to be produced. The resulting product is then calendered and heated for 10 minutes at a temperature of 130° C.

After this, the gasket is cut to the desired shape.

EXAMPLE 5

A perforated sheet is cut to the shape of the gasket desired and then coated with 100 grams per square meter of an emulsion of polyvinylacetate sold under the trademark "Rhodopas 5425," diluted with an equal volume of water.

A mixture consisting of 90% by weight of asbestos sold under the trademark "Grade 6D" and 10% by weight of phenoplastic resins sold by the Plastugil Company under the trademark "Phenorez 71" is then projected onto each face of this gasket.

A thicker deposit is made on some areas of the gasket than on others. The gasket is then compressed so as to give it a uniform thickness and cured at a temperature of 130° C for 15 minutes.

The result is a gasket which has zones of reduced compressibility which correspond to the zones of greatest thickness and which are separated by zones which are more compressible and correspond to the zones of normal thickness.

EXAMPLE 6

A smooth metallic sheet which is coated with 60 grams per square meter of a polyester varnish is cut to the shape of the desired gasket.

A mixture consisting of 90% by weight of cellulosic fibers and 10% by weight of gelatin is then immediately projected onto each surface of this sheet.

The resulting product is placed in a heating press which compresses it for 5 minutes at a temperature of 130° C under a pressure of 60–80 bars.

A coat of polyester varnish is then applied to the areas of the gasket which are to be subjected to the greatest pressure.

A mixture consisting of 75% by weight of cork having granules which vary from 0.5 to 1 mm in diameter, and 25% by weight of gelatin, is then projected onto the gasket. The cork adheres only to those portions of the gasket which have received the polyester varnish. The resulting gasket is compressed in a heating press for 5 minutes at a temperature of 100° C and a pressure of 10 bars.

This yields a gasket having zones which differ in thickness and compressibility.

When the particles to be projected are fibers, it is possible to advantageously use the process of electrostatic flocking which makes it possible to produce on the support fibers which are substantially perpendicular to the support in order to obtain an advantageous orientation of the fibers.

What is claimed is:

1. A method of making gaskets comprising the steps of projecting in particulate form on at least one surface of a support consisting of a substantially flattened surface at least 70 parts by weight of a filler material and at most 30 parts by weight of a heat settable binding agent to form a layer of low density, subjecting the support provided with this layer to a compression which reduces its thickness by 90% and thereby increases its density by at least 10 times, and treating said layer by application of heat to set the binding agent.

2. Method of making gaskets of fibrous material comprising the steps of projecting against at least one face of a support having a substantially plane surface from 70–90 parts of fibers and from 10–30 parts of a heat settable binding agent to form a thick layer of low density on said support, subjecting the support to a compression reducing the thickness of the sheet to not more than one one-hundredth of its original thickness and thereby increasing its density by at least 100 times, and treating the said layer by application of heat to set the binding agent.

3. Method as claimed in claim 1 comprising the step of treating said surface with an adhesion preventing material before said particulate material is projected thereagainst, and removing said support after said binding agent has set.

4. Method as claimed in claim 2 in which the thickness of said support is less than one-fourth that of the completed gasket.

5. Method as claimed in claim 1 comprising the step of applying an adhesive to a flat surface of said support.

6. Method as claimed in claim 2 in which the support is a perforated sheet less than 0.5 mm thick.

7. Method as claimed in claim 2 in which said layer is at least 5 cm thick.

8. Method as claimed in claim 1 in which said support is a cloth.

9. Method as claimed in claim 2 in which the material projected against said surface comprises 20 parts of elastomeric particles.

10. Method as claimed in claim 1 in which said material is projected by electro-static flocking.

11. Method as claimed in claim 1 in which said filler material comprises fibers and said fibers are oriented in different directions in different areas on the surface of said support.

12. Method as claimed in claim 1 in which the layer formed on said support varies in thickness from one part of said support to another.

13. Method as claimed in claim 1, in which said heat settable binding agent is selected from the group consisting of phenolic resins, urea-formol resins, epoxy resins, polyester resins, gelatin, and elastomers.

14. A method of making gaskets comprising the steps of projecting in particulate form on at least one surface of a support consisting of a substantially flattened surface at least 70 parts by weight of a filler material and at most 30 parts by weight of a heat fusible binding agent to form a layer of low density, subjecting the support provided with this layer to a compression which reduces its thickness by 90% and thereby increases its density by at least 10 times, and treating said layer by heat to cause fusion of said binding agent.

15. Method as claimed in claim 14, comprising the steps of projecting from 70–90 parts of fibers and from 10–30 parts of binding agent, and subjecting the support to a compression reducing the thickness of the sheet to not more than one one-hundredth of its original thickness and thereby increasing its density by at least 100 times.

16. Method as claimed in claim 14, in which said binding agent is selected from the group consisting of vinyl resins and polyethylene resins.

* * * * *